United States Patent Office 3,502,617
Patented Mar. 24, 1970

3,502,617
POLYISOUREAETHERS AND THEIR
PREPARATION
Hans-Dieter Schminke, Cologne-Mulheim, Wilhelm Gobel, Cologne-Flittard, Ernst Grigat, Cologne-Stammheim, and Rolf Putter, Duesseldorf, Germany, assignors to Farbenfabriken Bayer Aktiengesellschaft, Leverkusen, Germany, a corporation of Germany
No Drawing. Continuation-in-part of application Ser. No. 442,167, Mar. 23, 1965. This application Aug. 1, 1967, Ser No. 657,510
Int. Cl. C08g 33/02, 49/04
US. Cl. 260—47         12 Claims

ABSTRACT OF THE DISCLOSURE

Novel polyisoureaethers are prepared by reacting polyvalent organic cyanic acid esters with polyvalent primary or secondary amines.

---

This application is a continuation-in-part of copending application Ser. No. 442,167, filed Mar. 23, 1965, now abandoned. The invention relates to organic chemical compositions and more particularly to synthetic polymeric materials.

This invention has as an object the preparation of new polymeric materials. A further object is the preparation of linear or crosslinked polymeric resins. Another object is the preparation of polymers which can be utilized in the manufacture of films and plastics. Still another object is the improvement of synthetic resins. Other objects will appear hereinafter.

These objects are accomplished by reacting polyvalent organic cyanic acid esters with polyvalent primary or secondary amines. The products are polymers. When the reactants are bifunctional, i.e. when one reactant contains two cyanic acid ester groups and the other reactant contains two amino groups, the products are linear. When the reactants are of higher functionality, cross-linked polymers are obtained. When one of the reactants is already polymerised, the product is a modified polymer of higher molecular weight.

As it is known the cyanic acid exists in several tautomeric forms such as HOCN, HNCO, HCNO, HONC. The salts and esters thereof are more clearly defined and identified, but of course are still isomeric forms. The esters of the cyanic acid have the structural formula A—O—C≡N. Polyvalent organic cyanic acid esters, therefore, which are useful as starting material in the manufacture of the new resins include compounds of the formula $R(OCN)_x$, in which R is any aromatic, araliphatic or heterocyclic radical. $x$ is an integer of at least two and preferably between 2 and 6, more preferably between 2 and 3.

It is preferred to employ compounds which have their OCN-groups attached to an aromatic ring system. The polyvalent cyanic ester, therefore, in its simplest form can be derived from benzene, naphthalene, anthracene or the like. It can be e.g. the compound

or

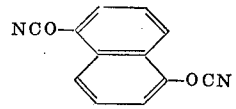

It is of course possible that in the previous type the ring system carries substituents e.g.

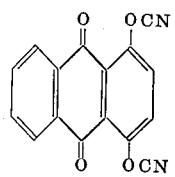

R may carry further substituents R′ in addition to the OCN groups, e.g. may be looked at as $(R')_y Ar$, R′ being alkyl- ($C_1$—$C_4$), cycloalkyl- ($C_5$—$C_6$), aralkyl- ($C_7$—$C_{10}$)

or phenyl-dialkyl-($C_1$—$C_4$)-amino-, acyl-($C_1$-$C_3$)-amino-, halogen-, nitro-, sulphonic acid lower alkyl ($C_1$-$C_4$) ester-, sulphonic acid amide-, carboxylic acid-lower alkyl ($C_1$—$C_4$) ester-, carboxylic acid amide-, alkoxy-($C_1$—$C_4$), phenoxy-, acyl-($C_1$—$C_3$)-oxy-, acyl-($C_1$—$C_4$)-, aldehyde-, sulphonic-, thiocyanogen-, isothiocyanogen-, isothiocyanogen-, alkyl-($C_1$—$C_4$)-mercapto-, phenyl mercapto-, acyl-($C_1$—$C_4$)-mercapto- and cyanic acid groups.

Another type contemplated in the present invention as starting material comprises cyanic esters in which several aromatic nuclei are connected together like in the diphenyl series, e.g.

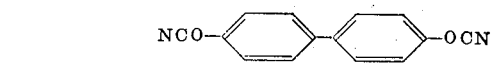

or

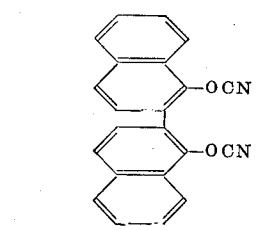

Further useful compounds include aromatic materials in which the aromatic nuclei are bridged through alkylene residues or hetero atoms such as —O—, —S—, —SO$_2$—, —CO—, —C(CH$_3$)$_2$—, —CH(CH$_3$)—,

—CH(CH$_3$)—CH$_2$—C(CH$_3$)$_2$, —CH$_2$—O—CH$_2$—

Another class of aromatic cyanic acid esters comprises compounds with repeated bridges of the before-mentioned type, for example,

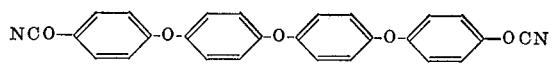

or

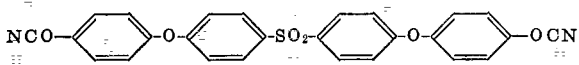

The invention further contemplates the use of starting cyanic acid ester compounds of the general formula:

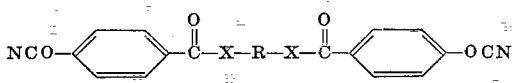

with X=O or NH or NR', R' being a lower alkyl —(C₁—C₆)-radical, R is the residue of e.g. a hydrocarbon up to 12 C-atoms, an oligoglycol or polyglycol including, for instance, polyalkylene glycol ether or a polyester, polyurea, polyamine, polyurethane or polyamide residues deprived from their functional hydroxyl or amino groups and having a molecular weight up to 10,000.

Another group of cyanic esters includes compounds like

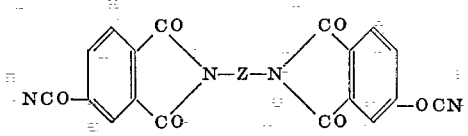

wherein Z represents aliphatic or aromatic hydrocarbon radicals which may also contain hetero atoms, such as

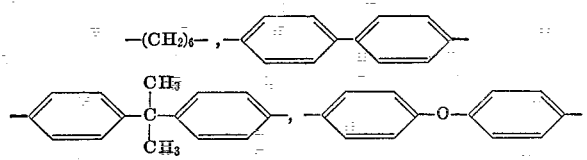

Still further starting materials comprise compounds of the following type:

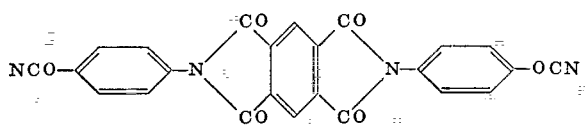

or

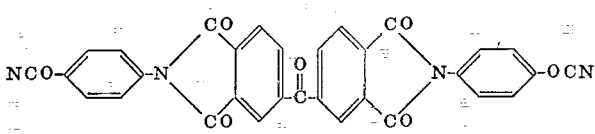

For sake of convenience several classes of aromatic cyanic esters, which are preferred, have been discussed with the cyanic groups in para-position. It is understood that OCN-groups in meta- or other positions are useful as well. It is further understood that the aromatic nuclei can have substituents as outlined above. Preferred substituents are the halogens, especially fluorine and chlorine, the lower alkyls. It is also understood that the above-mentioned types given as examples can have more than two cyanic groups. It is, however, preferred to employ bivalent cyanic acid esters.

The following are examples of suitable polyvalent cyanic acid esters: Unsubstituted and substituted bis and polycyanato aromatic compounds such as 1:3- or 1:4-dicyanato benzene;
1:3- or 1:4- or 1:5- or 1:6- or 1:7- or 1:8- or 2:6- or 2:7-dicyanato naphthalene;
1:4- or 1:5-dicyanato anthraquinone;
1:3:5-tricyanatobenzene;
1:3:5- or 1:3:6- or 1:3:7-tricyanatonaphthalene;
2:2'- or 3:3'- or 4:4'-dicyanatodiphenyl,
2:2'- or 4:4'-dicyanatodinaphthyl(1:1'), 1-methyl-3:5-dicyanatobenzene;
1-methyl-2:5-dicyanatobenzene;
2-(o-chlorophenyl)-1:4-dicyanatobenzene;
4-chloro-1:3-dicyanatobenzene;
2-chloro-1:4-dicyanatobenzene;
2-bromo-1:4-dicyanatobenzene;
3:5:3':5'-tetrachloro-2:2''-dicyanatodiphenyl;
2-nitro-1:3-dicyanatobenzene;
4-acetyl-1:3-dicyanatobenzene;
2:4-, 3:5-dicyanatobenzoic acid esters,
1:4-dicyanatobenzene-2:5-dicarboxylic acid ester,
4:6-dicyanatobenzene dicarboxylic acid ester-1:3;
4:4'-dicyanato-diphenyl-carboxylic acid(2-ester;
2:3-dicyano-1:4-dicyanatobenzene; and further, unsubstituted and substituted polycyanato compounds in which the radicals which carry the cyanato group are connected by bridge members, such as 4:4'-dicyanatodiphenylmethane;
4:4'-dicyanatodiphenyl-methyl-methane;
4:4'-dicyanato-diphenyl-dimethylmethane;
1:1-bis-(4-cyanatophenyl)-cyclohexane;
4:4-bis-(4'-cyanatophenyl)-valeric acid ester;
5:5'-methylene-bis-(2-cyanatobenzoic acid ester);
5:5'-methylene-bis-(2-cyanato-3-methylbenzoic acid ester);
2:2'-dicyanatodinaphthyl(1:1')-methane;
4:4'-dicyanato-diphenylethane;
4:4'-dicyanatostilbene;
4:4'-dicyanato-diphenylether;
4:4'-dicyanatobenzophenone; and
4:4''-dicyanatodiphenylsulphone.

Further starting materials are derived from condensation products of phenols and aldehydes, such as novolaks, or from phenol modified xylene formaldehyde resins, which are reacted with halogen cyanide to give polycyanic esters in accordance with French Patent 1,481,425.

Mixtures of polyvalent cyanates can, of course, be used.

Polyvalent organic cyanic acid esters can easily be prepared in accordance with the detailed description of French Patent 1,389,079 from polyvalent phenols and cyanogen halides, e.g. chlorocyanide at temperatures up to 65° C. in the presence of an organic or inorganic basically reacting compound.

The amines useful in the present invention can be primary amines or secondary amines or mixed primary/secondary amines. It is essential that there are at least two amino groups with at least one hydrogen atom on each amino nitrogen atom. Besides this, the amine can be of aliphatic, araliphatic, aromatic, heterocyclic or cyclic nature with any substituents. Bivalent amines are preferred.

Preferred amines have the formula:

$$(R'')_y Ar-NHR''')_2$$

wherein Ar is the benzene or naphthalene residue, R'' is hydrogen or an alkyl-(C₁—C₄), cycloalkyl-(C₅—C₆), aralkyl-(C₇—C₁₀) or phenyl dialkyl-(C₁—C₄)-amino-, acyl-(C₁—C₃)-amino-, halogen-, nitro-, sulphonic acid lower alkyl (C₁—C₄) ester-, sulphonic acid amide-, carboxylic acid lower alkyl (C₁—C₄) ester-, carboxylic acid amide-, alkoxy-(C₁—C₄)-, phenoxy-, acyl-(C₁—C₃)-oxy-, acyl-(C₁—C₄)-, aldehyde-, sulphonic-, alkyl-(C₁—C₄)-mercapto-, phenylmercapto-, acyl (C₁—C₄)-mercapto group. R''' is hydrogen or a lower alkyl (C₁—C₆).

Another class which is preferred are aliphatic amines with two NH R''' groups and an aliphatic hydrocarbon chain up to 12 carbon atoms with R''' being hydrogen or a lower alkyl (C₁—C₆).

Still another class of preferred polyvalent aliphatic amines with two NHR''' groups are those with an aliphatic hydrocarbon chain up to 30 carbon atoms which is interrupted or substituted by groups containing only O, N or S atoms, R''' being hydrogen or a lower alkyl ($C_1$—$C_6$).

Another preferred class are polyvalent amines of elevated molecular weight for instance up to 10,000 which are polyethers, polyesters, polyester amides, polyamides, polyurea, polyester urethanes or polyether urethanes with 2 NHR''' groups in which R''' is hydrogen or lower alkyl ($C_1$—$C_6$).

Another very suitable class of amines useful in the present invention are amines having the formula:

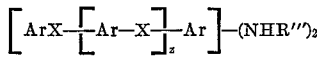

wherein the NHR''' groups are attached to the same or different Ar; Ar is a member selected from the group consisting of benzene and naphthylene, z is an integer from 0 to 7 and X is a bridging member selected from the group consisting of a direct bond, oxygen, sulfur, $SO_2$, CO, alkylene having from 1 to 12 carbon atoms and

wherein R is alkylene having from 1 to 6 carbon atoms and A is oxygen or sulfur; R''' is hydrogen or a lower alkyl ($C_1$—$C_6$).

The following amines may be mentioned as examples:
1:2-diaminoethane;
1:2- or 1:3-diaminopropane;
1:2- or 1:3- or 1:4- or 2:3-diaminobutane;
1:2- or 1:3- or 1:4- or 1:5- or 2:3- or 2:4-diaminopentane,
the corresponding diaminohexanes, -heptanes, -octanes, -nonanes, -decanes, undecanes, dodecanes, -hexadecanes, octadecanes,
1:4-diaminobutene,
1:4-diamino-2-methylbutane,
1:5-diamino-2:2-dimethylpentane;
1:5-diamino-2:2:4-trimethylpentane;
di-(β-aminoethyl)-thio-ether;
di-(γ-aminopropyl)-ether;
di-(γ-aminopropyl)-thioether;
1:6-diamino-3-methoxy-hexane;
1:6-diamino-3-butoxyhexane;
1:4-butylene glycol-dipropylether-ω:ω'-diamine·
di-(ω-aminohexyl)-thioether;
bis-(2-aminoethyl)-amine;
dipropylene-(1:2)-triamine;
tripropylene(1:2)-tetramine;
bis-(3-aminopropyl)-amine;
bis-(3-aminopropyl)-methylamine;
N:N'-dimethyldiaminoethane-1:2;
N:N'-diethyldiaminoethane-1:2;
1-amino-3-methylaminopropane;
piperazine;
N-2-aminoethyl-piperazine;
4-aminopiperidine;
ω:ω'-diamino-1:3-(or -1:4-)dimethylbenzene;
ω:ω'-diamino-1:4-(1:2)-dimethylcyclohexane;
ω:ω'-diamino-1:4-diethylbenzene;
ω:ω'-diamino-1:4-(or -1:5-)-dimethylnaphthalene;
ω:ω'-diamino-di-n-propyldiphenyl;
1:2- or 1:3- or 1:4-diaminocyclohexane;
1-methyl-2:4-diaminocyclohexane;
1-ethyl-2:4-diaminocyclohexane;
4:4'-diamino-dicyclohexylmethane;
4:4'-diamino-dicyclohexane;
4:4'-diamino-dicyclohexylmethylmethane;
4:4'-diamino-dicyclohexyldimethylmethane;
4:4'-diamino-2:2'-dimethyl-dicyclohexylmethane;
4:4'-diamino-3:3'-dimethyl-dicyclohexylmethane;
4-aminobenzylamine;
2-(4'-aminophenyl)-1-aminoethane;
1-(3'-aminophenyl)-1-aminoethane;
3-(3'- or 4'-aminophenyl)-1-aminopropane;
3-(3'- or 4'-aminophenyl)-1-aminobutane;
tetrahydronaphthylene-diamine-1:5 or 1:4;
hexahydrobenzidine-4:4'-diamine;
hexahydrodiphenylmethane-4:4'-diamine;
1:2-, 1:3-, 1:4-diaminobenzene;
1-methyl-2:4-(or 2:3- or 3:4- 2:6- or 2:5- or 3:5)-diaminobenzene;
1:3-dimethyl-2:4-(or 4:6)-diaminobenzene;
1:4-dimethyl-2:5-diaminobenzene;
1-ethyl-2:4-diaminobenzene;
1-isopropyl-2:4-diaminobenzene;
diamino-diethylbenzene;
diisopropyl-diaminobenzene;
1-chloro-2:4-diaminobenzene;
1-nitro-2:4-(or -2:5)-diaminobenzene,
1:3-dichloro-2:4-(or -4:6)-diaminobenzene,
1:4- dichloro-2:5-diaminobenzene,
1-chloro-4-methoxy-2:5-diaminobenzene,
1-methoxy-2:4-(or -2:5)-diaminobenzene,
1-methyl-4-methoxy-2:5-diaminobenzene,
1-ethoxy-2:4-diaminobenzene,
1:3-dimethoxy-4:6-diaminobenzene,
1:4-dimethoxy-2:5-diaminobenzene,
1-propoxy-2:4-diaminobenzene,
1-isobutoxy-2,4-diaminobenzene,
1,4-diethoxy-2,5-diaminobenzene,
4,4'-diaminobenzene,
4,4'-diaminobenzene-azonaphthalene,
2:4-(or -4:4')-diaminodiphenylether,
ethylene glycol-diphenylether-2:2'-diamine,
diethylene glycol-diphenylether-2:2'-diamine,
N:N'-dimethyl-phenylenediamine-1:3 or 1:4,
N-methylphenylenediamine-1:4, 1:3- or 1:4- or 1:5- or 1:6- or 1:7- or 1:8- or 2:6- or 2:7-naphthalenediamine,
1:1-dinaphthyl-2:2'-diamine,
4:4'-diaminodiphenylamine,
4:4'-diaminodiphenylamine-sulphonic acid(2), 2:4'- or 4:4'-diaminodiphenyl,
3:3'-dimethyl-4:4'-diaminodiphenyl,
3:3'-dimethoxy- (or diethoxy)-4:4'-diaminodiphenyl,
3:3'-dimethyl-4:4'-diamino-6:6'-dinitrodiphenyl,
2:2- or 3:3'-dichloro-4:4'-diaminodiphenyl,
2-nitro-4:4'-diaminodiphenyl,
4:4'-diamino-diphenyl-dicarboxylic acid ester-3:3',
2:4:4'-triaminodiphenyl,
4:4'-diaminodiphenyl-methane,
4:4'-diaminodiphenyl-methylmethane,
4:4'-diaminodiphenyl-dimethylmethane,
2:2'-dimethyl-4:4'-diamino-diphenylmethane,
2:5:2':5'-tetramethyl-4:4'-diaminodiphenyl-methane,
1:1-di-(4'-aminophenyl)-cyclohexane,
1:1-di-(4'-amino-3'-methoxyphenyl)-cyclohexane,
1:1-di-(4'-amino-3'-methylphenyl)-cyclohexane,
3:3'-diamino-benzophenone,
2:4-diamino-diphenylethane-1:2,
4:4':4''-triamino-triphenylmethane,
4:4'-diamino-3:3'-diamino-3:3'-dimethoxy-triphenylmethane,
4:4'-diamino-2:2':5:5'-tetramethyltriphenylmethane,
4:4'-diamino-2:2':5:5'-tetramethyl-2''-chlorotriphenylmethane,
2,7-fluorene diamine,
2:6-diaminoanthraquinone, 9-ethylcarbazole-3:6-diamine,
pyrene-3:8-diamine,
chrysene-2:8-diamine,
benzidinesulphonic-4:4'-diamine,
diphenylsulphide-2:4-diamine,
diphenyldisulphide-4:4'-diamine,
diphenylsulphone-4:4'-diamine,
diphenylmethanesulphone-4:4'-diamine,
4-methyl-3-aminobenzene sulphonic acid(4'-aminophenyl)-ester,
4-methyl-3-amino-benzene sulphonic acid-4'-amino-3'-methylanilide,
di-(4-aminobenzenesulphonyl)-ethylenediamine,
3:3'-dimethoxy-4:4'-diaminodibenzylthioether, 4:4'-dimethoxy-3:3'-diaminobenzenethioethylene-glycol,
3:3'-dimethoxy-4:4'-diaminodibenzylsulphone,
1-methyl-2:4:6-triaminobenzene,
1:3:5-trimethyl-2:4:6-triaminobenzene,
1:3:7-triaminonaphthalene,
2:4:4'-triaminodiphenylmethane, 3-methyl-4:6:4'-triaminophenylmethane,
4:4'-dimethyl-2:2':5:5'-tetraminodiphenylmethane and melamine. Piperazine is preferred.

Polyethers having —NH$_2$, —NHCH$_3$, —NHC$_2$H$_5$ or other —NH-alkyl groups up to 20 C-atoms, NH—C$_6$H$_5$ and higher homologues as end groups can be used as well as polyester, polyester amides or polyamides having these end groups. Also to be mentioned are reaction products of polyisocyanates with an excess of amines, that is polyureas with terminal amino groups.

Mixtures of polyvalent amines can, of course, be used.

In carrying out the invention the polyvalent cyanic acid esters and the polyvalent amines are simply brought together. They react with each other without addition of any other substance such as catalysts, additives and the like. In most cases the reaction begins already at room temperature or even at temperatures below room temperature, such as 0° C. or less. The reaction proceeds with sufficient speed at room temperature.

Sometimes, depending on the nature of the specific starting material it might be advantageous to complete the reaction by raising the temperature or to proceed at all at elevated temperature. In general, temperatures up to 100° C. are believed to be sufficient. The reaction need not, but is preferred to take place in a solvent. The concentration of the reactants is not critical. Suitable solvents are, for example, aliphatic and aromatic hydrocarbons which may, if desired, be halogenated or nitrated, e.g. benzene, toluene, chlorobenzene, nitrobenzene, ligroin, chloroform, carbon tetrachloride and nitromethane; equally suitable are esters and amides such as ethyl acetate and dimethylformamide; ketones such as acetone, methyl ethyl ketone, ethers such as diethyl ether, dioxane and diethylene glycol-mono (or -di)-ethyl ether; alcohols such as methanol, ethanol and isopropanol; nitriles such as acetonitrile or dimethylsulphoxide.

In general, the components are reacted together in equivalent quantities although the cyanate component can be used in excess if it is desired to obtain a reaction product having free cyanate groups, and the amine component can be used in excess if it is desired to have free amino groups in reaction product.

If the product precipitates, it may be isolated by vacuum filtration. In other cases the reaction product may be isolated by pouring the reaction solution into a solvent in which the reaction product is insoluble and hence precipitates and can be removed by vacuum filtration. Examples of suitable solvents for this purpose are water, methanol and ethanol. Alternatively, the solvent can be removed by evaporation. If the product contains sulphonic acid groups, then it may be obtained by salting out after pouring the reaction solution into water.

The synthetic resins obtained by the process of the invention can be worked up by known methods of working up commonly employed in the field of synthetic resins to produce a large variety of different articles with valuable physical and chemical properties.

They can, for example, be kneaded, rollered, pressure-moulded or injection-moulded at elevated temperatures and pressures to produce a variety of shaped articles. It is also possible to work them up from solutions, especially to form lacquer coatings, films and foils. These substances can be worked up without or with additives such as plasticisers, fillers, pigments, antistatic agents, flame-protective agents. The products of the present invention can be processed together with other polymers. Such blends allow for modifications of the mechanical properties in the foil, film and mouldings.

Suitable substances for use as plasticisers are the usual esters of aromatic or aliphatic mono-, di- or poly-carboxylic acids, e.g. acetates, adipates, sebacates, azelainates, benzoates, phthalates, isophthalates, terephthalates, trimellithates or pyromellithates. Polymer plasticisers based on polyesters, phosphoric acid esters, alkylsulphonic acid esters, phenols extended with polyether groups, alcohols, glycols or thiodiglycols, which compounds may also be substituted, are also used as plasticisers. In addition, multi-nuclear aromatic compounds such as diphenyl, terphenyls or their chlorinated, nitrated or sulphonated derivatives are to be mentioned. Fillers which are often used such as chalks and silicates may be blended with the new polymers but other salts and, if desired, strongly oxidizing substances such as nitrates, chlorates and perchlorates can also be used. In addition, the reaction products can be worked up with sawdust, natural and synthetic fibres and fabrics and with carbon blacks including conductive carbon blacks.

To reduce the inflammability, non-inflammable compounds of phosphorus or of antimony or halogen compounds can be worked into the new polymers or applied to their surface. Compounds which reduce the surface resistance, hydrophilic substances such as polyglycols or quaternary ammonium compounds can also be incorporated. Also, they may be blended with numerous known polymers such as polyvinyl chloride and its copolymers, polyvinylidene chloride, polystyrene, styrene-acrylonitrile copolymers and ABS copolymers, natural and synthetic rubber, chlorine rubber, butadiene-acrylonitrile copolymers and ethylene-vinyl acetate copolymers as well as vinyl chloride-ethylene-vinyl acetate copolymers. Further, they can be combined with cellulose esters and the precondensation products of phenol-formaldehyde resins.

Working up with mono- and polyisocyanates as well as with polyurethanes is also possible.

When the new polymers have been hardened, if necessary with the use of pressure at elevated temperatures, the synthetic resins produced according to the invention give rise to highly cross-linked, glass-clear synthesis resins with a very hard surface. They have very good adhesion to metal, wood, glass and synthetic resins and a very good resistance to chemicals.

The more detailed practice of the invention is illustrated by the following examples. There are of course many forms of the invention other than these specific embodiments.

EXAMPLE 1

A solution of 28 g. of 4:4'-dicyanato-diphenyl-dimethylmethane in 100 ml. of dimethylformamide is added dropwise to a solution of 8.6 g. of piperazine in 100 ml. of dimethylformamide at 60° in the course of 15 minutes. The mixture is then stirred for another 10 minutes and the clear solution is poured into 1 litre of water. The white precipitate is removed by vacuum filtration washed with water and dried in a drying cupboard. Yield: 33.7 g. M.P. 120–130°. Molecular weight (in chloroform): 1 050.

The IR spectrum shows the characteristic bands for the isourea ether group at 6.1μ.

It is also possible to distil off the solvent in vacuo and crystallise the viscous residue by trituration with water.

In an analogous manner, 16.3 g. of a product of melting point 130° are obtained from 14 g. of 4:4'-dicyanato-diphenyl-dimethylmethane and 4.3 g. of piperazine, using dioxane as solvent.

The product is dissolved in methylene chloride, which is gently heated, to a 20 percent solution. The solution is cast onto glass plates and forms a quickly drying plain film which after storage at 150° C. gives a glass-clear very hard coating with good adhesion which is insoluble in all usual solvents.

Before casting the solution can also be blended with one of the materials mentioned in the following table and then yields the films described in the table. The percentages per weight given in the table are calculated on the mixture of resin and plasticising additive.

| Plasticiser | Percent by weight | Appearance | Adhesion | Surface |
|---|---|---|---|---|
| (a) Dioctyl phthalate | 10 | Transparent | Good | Hard. |
| (b) Dicyclohexylphthalate | 10 | Glass-clear | do | Very hard. |
|  | 20 | do | do | Do. |
|  | 30 | do | do | Hard. |
|  | 40 | do | do | Elastic. |
| (c) Dibutyl adipate | 10 | do | do | Very hard. |
|  | 20 | do | do | Do. |
| (d) Benzylbutyl adipate | 10 | do | do | Do. |
|  | 20 | Transparent | do | Do. |
| (e) Diphenyl cresyl phosphate. | 20 | Glass clear | do | Do. |
|  | 30 | do | do | Hard. |
|  | 40 | do | do | Elastic. |
| (f) Polyether | 20 | do | do | Very hard. |
|  | 30 | do | do | Elastic. |
|  | 40 | do | do | Do. |
| (g) Adipic acid/butane diol polyester (molecular weight (2,000). | 10 | Transparent | do | Do. |
| (h) Butadiene/acrylo nitrile copolymerisate with 28% acrylo nitrile. | 10 | do | do | Do. |

Instead of being dissolved in a solvent the resin obtained as above can also be processed in the solid state under a press starting at 20° C. During the pressure moulding the press is slowly heated to 150° C. and held at this temperature for 10 minutes. After cooling and demoulding a crosslinked very hard moulding is obtained.

Before moulding it is possible to blend the new resin with diphenyl cresyl phosphate in a ratio of 90:10 or 80:20 or 70:30. Thereby a hard or slightly elastic moulding with good resistance to chemicals is obtained.

It is possible to sinter the new resin for two hours at 150° to produce a solid moulding with the following properties.

Identation hardness according to DIN 53456 after 10 seconds—1720 kg./cm.$^2$
Identation hardness according to DIN 53456 after 60 seconds—1610 kp./cm.$^2$
Deflection temperature according to Martens (DIN 53 458)—80° C.
Deflection temperature according to Vicat (VDE 0302)—120° C.

EXAMPLE 2

8.6 g. of piperazine are dissolved in 100 ml. of acetone. A solution of 60 g. of 1:4-dicyanato-benzene in 100 ml. of acetone are added dropwise to this solution at boiling point within 30 minutes. A white granular precipitate is immediately formed. The mixture is stirred for another 30 minutes, filtered with suction and washed with acetone. Yield: 18.2 g., M.P. 109–111°.

In an analogous manner, 10 g. of a yellowish product of melting point 132 to 133° are obtained from 8 g. of 1:4-dicyanato-benzene and 4.3 g. of piperazine, using chloroform as solvent.

EXAMPLE 3

8.6 g. of piperazine are dissolved in 100 ml. of dimethylformamide and heated to 60°. A solution of 16 g. of 1:3-dicyanato-benzene in 100 ml. of dimethylformamide is added to this dropwise. After stirring for another 15 minutes, the solution is poured into 1 litre of water, filtered with suction and the precipitate washed with water. Yield: 10 g., M.P. 103–130°.

EXAMPLE 4

4.3 g. of piperazine are dissolved in 100 ml. of dimethylformamide and heated to 90°. 10.5 g. of solid naphthylene-1:5-bis-cyanate are introduced over 45 minutes and the mixture stirred for a further 30 minutes at the same temperature. The solution is filtered from the undissolved residue and run into 1 litre of water. After suction filtration, washing and drying, 9 g. of a product melting at 107° C. are obtained.

EXAMPLE 5

A solution of 28 g. of 4:4'-dicyano-diphenyl-dimethylmethane in 100 ml. of acetone is added dropwise in the course of 20 minutes, at 20 to 25°, to a solution of 11.6 g. of hexamethylene diamine in 100 ml. of acetone. The precipitated product is separated by suction filtration, washed several times and dried. Yield: 31.5 g., M.P. 80°.

EXAMPLE 6

In a manner analogous to Example 5, 18.5 g. of a product which begins to melt at 48° are obtained from 28 g. of 4:4'-dicyanato-diphenyl-dimethymethane and 6 g. of ethylene diamine.

EXAMPLE 7

86 g. of piperazine and 116 g. of hexamethylene diamine are dissolved in 2 litres of dimethylformamide, and a solution of 560 g. of 4:4'-dicyanato-diphenyl-dimethylmethane in 1.2 litres of dimethylformamide is added dropwise to this in the course of 70 minutes at room temperature. The filtered solution is run into water and the colourless precipitate is removed by suction filtration. Yield: 573 g., M.P. 110°.

With this new resin three mixtures are prepared by blending (a) 45 parts by weight of dioctyl phthalate and 5 parts by weight of the resin, (b) 40 parts by weight of dioctyl phthalate and 10 parts by weight of the resin, (c) 35 parts by weight dioctyl phthalate and 15 parts by weight of the resin each with 50 parts by weight of polyvinyl chloride with suspension polymerisation, 1 part by weight of a barium/cadmium stabiliser and 3 parts by weight of an epoxide costabiliser. Homogenisation is effected within 10 minutes at 160° C. on a roller. The sheets thus obtained can be pressed to mouldings which with increasing amounts of the new resin show increasing resistance against chemicals with good mechanical properties.

Instead of the dioctyl phthalate a butadiene acrylo nitrile copolymer can be employed. The moldings thus obtained exhibit good mechanical properties and increased resistance against solvents.

EXAMPLE 8

11.2 g. of hexahydro-1:4-phenylene diamine are dissolved in 100 ml. of dimethylformamide and heated to 60°. A solution of 28 g. of 4:4'-dicyanato-diphenyl-dimethylmethane in 100 ml. of dimethylformamide is added dropwise in the course of 30 minutes, the solution stirred for another 30 minutes and poured, with vigorous stirring, into 1 litre of water. The dry product begins to melt at 98°. Yield: 36 g.

EXAMPLE 9

In a manner analogous to Example 8, 37 g. of a product of melting point 125° are obtained from 28 g. of 4:4'-dicyanato-diphenyl-dimethylmethane and 11 g. of p-phenylene diamine.

EXAMPLE 10

A solution of 14 g. of 4:4'-dicyanato-diphenyl-dimethylmethane in 50 ml. of dimethylformamide is added dropwise to a solution of 11.3 g. of 4:4'-diamino-diphenyl-dimethylmethane in 50 ml. of dimethylformamide at 20 to 25°. The solution is then stirred for another 30 minutes and poured into 1 litre of water. The precipitated product is removed by suction filtration, washed with water and dried. Yield: 23.5 g., M.P. 125°.

EXAMPLE 11

In a manner analogous to Example 10, a yield of 32 g. of a product of melting point 85° is obtained from 28 g. of 4:4'-dicyanato-diphenyl-dimethylmethane and 13 g. of N-(2-aminoethyl)-piperazine.

EXAMPLE 12

7.75 g. of piperazine and 9.4 g. of a tetrahydrofuran polymer with terminal $CH_3$—NH groups (molecular weight 940) are dissolved in 100 ml. of dimethylformamide. A solution of 28 g. of 4:4'-dicyanato-diphenyl-dimethylmethane in 100 ml. of dimethylformamide is added dropwise to this solution at room temperature in the course of 12 minutes. After 30 minutes, the reaction mixture is run into water and the precipitated product is removed by suction filtration. Yield: 40.1 g., M.P. 120°.

EXAMPLE 13

13.3 g. of dipropylene-1,2-triamine are dissolved in 20 ml. of acetone. Within 15 minutes a solution of 28 g. of 4,4'-dicyanato-diphenyl dimethyl methane in 70 ml. of acetone is added dropwise at 25 to 30° C. The solution is then stirred for another 15 minutes and poured into 1 litre of water. The precipitated colourless products melts after drying at 95° C. Yield 33 g.

EXAMPLE 14

A solution of 28 g. of 4,4'-dicyanato-diphenyl dimethyl methane in 80 ml. of dimethyl formamide is added dropwise to a solution of 14.5 g. of bis-(3-aminopropyl)-methyl amine in 20 ml. of dimethyl formamide at 25 to 30° C. After pouring into water the precipitated resin at first is greasy, but becomes solid after trituration. Yield 39 g.; M.P. 90° C.

EXAMPLE 15

12.6 g. of 2,2'-dichloro-4,4'diamino diphenyl are dissolved in 100 ml. of dimethyl sulfoxide and heated to 80° C. Within five minutes a solution of 14 g. of 4,4'-dicyanato-diphenyl dimethyl methane in 70 ml. of dimethyl sulfoxide is added. At this temperature the solution is stirred for another 60 minutes. After cooling to room temperature the clear solution is poured into 1 litre of water which has added thereto some sodium chloride. Yield 19.5 g.; M.P. 157° C.

EXAMPLE 16

21.2 g. of 4,4'-diamino benzophenone are dissolved in 150 ml. of dimethyl formamide. A solution of 28 g. of 4,4'-dicyanato-diphenyl dimethyl methane in 70 ml. of dimethyl formamide is added while stirring at 80° C. The solution is then stirred for another 30 minutes and poured into water. The dry resin melts at 160° C. Yield 43 g.

EXAMPLE 17

In a manner analogous to Example 16 7.9 g. of 1,5-naphthylene diamine are reacted with 14 g. of 4,4'-dicyanato-diphenyl dimethyl methane. Yield 16 g.; M.P. 160° C.

EXAMPLE 18

A solution of 21 g. of 4,4'-dicyanato-diphenyl dimethyl methane in 150 ml. of methanol is added within five minutes at 50° C. to a solution of 14.5 g. of 4,4',4''-triamino-triphenyl methane in 250 ml. of methanol. After 30 minutes the precipitated resin is filtered with suction and washed with methanol. Yield 28 g.; M.P. 160° C.

EXAMPLE 19

A solution of 22.4 g. of the sodium salt of 2,6-diamino-toluene-4-sulfonic acid in 200 ml. of formamide are mixed with a solution of 28 g. of 4,4'-dicyanato-diphenyl dimethyl methane in 100 ml. of dimethylformamide. The mixture is heated to 80° C. for one hour and then poured into 2 litres of water. The reaction product is salted out at 60° C. with 150 g. of sodium chloride. The product is dried in the air and washed with alcohol. Yield 30 g.; M.P. 360° C.

EXAMPLE 20

A solution of 14 g. of 4,4'-dicyanato-diphenyl dimethyl methane in 70 ml. of dimethyl sulfoxide is added dropwise within 10 minutes at 80° C. to a solution of 20.7 g. of the sodium salt of 4,4'-diamino-stilbene-2,2'-disulfonic acid in 250 ml. of dimethyl sulfoxide. The mixture is then stirred for another 30 minutes and poured into 1.5 ml. of water. The resin is salted out at 50° C. and washed with alcohol. Yield 14 g.; M.P. more than 160° C.

EXAMPLE 21

A solution of 28 g. of 4,4'-dicyanato diphenyl dimethyl methane in 100 ml. of dimethyl formamide in 100 ml. of dimethyl formamide is added dropwise to a solution of 21.8 g. of 4,4'-diamino diphenyl sulfide in 65 ml. of dimethyl formamide. After stirring for one hour the reaction mixture is poured into water. Yield: 45 g.; M.P.: 151° C.

EXAMPLE 22

In a manner analogous to Example 21 50 g. of a product are obtained at 60° C. from 24.8 g. of 4,4'-diamino diphenyl sulfone and from 28 g. of 4,4'-dicyanato diphenyl dimethyl methane. The melting point of the obtained product is between 105 and 150° C.

EXAMPLE 23

A solution of 10 g. of 2,2'-dicyanato-3,3',5,5'-tetramethyl dibenzyl ether in 100 ml. of dimethyl formamide is added dropwise to a solution of 2.56 g. of piperazine in 50 ml. of dimethyl formamide, temperature thereby rising to 36° C. After stirring for one hour the solution is added dropwise to 1.5 l. of water. Yield: 11 g.; M.P.: 100° C.

EXAMPLE 24

A solution of 30 g. of 4,4'-dicyanato diphenyl sulfone in 180 ml. of dimethyl formamide is added dropwise to a solution of 8.6 g. of piperazine in 100 ml. of dimethyl formamide. After stirring the mixture for one hour and pouring into water 20.9 g. of a product with a melting point of 96° C. are obtained.

EXAMPLE 25

A solution of 10.1 g. of 2,4-dicyanato aceto phenone in 50 ml. of acetone is added dropwise to a solution of 5.8 g. of hexamethylene diamine in 60 ml. of acetone, the inner temperature thereby rising to 46° C. A product with a melting point of 123° C. is obtained in the usual manner.

The product obtained in analogous manner from 2,4-dicayanto aceto phenone and hexahydro-p-phenylene diamine melts at 150° C. If piperazine is used as diamine component, the reaction product then has a melting point of 119 to 124° C.

What is claimed is:

1. A high molecular weight condensation product containing a plurality of recurring

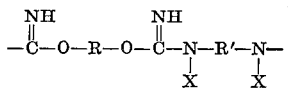

groups in which R is the residue of an organic cyanic ester, R' is the residue of a polyvalent amine and X is selected from hydrogen and organic radicals, said product being prepared by reacting about equimolar portions of (a) a cyanic ester having the formula:

$$Ar(\!-\!O\!-\!C\!\equiv\!N)_x$$

wherein Ar is an aromatic radical, the —O—C≡N groups being bonded directly to a nuclear carbon atom thereof, and $x$ is an integer from 2 to 6 and (b) an amine having at least two amino groups with at least one hydrogen atom on each amino nitrogen atom.

2. The condensation product according to claim 1 wherein the cyanic ester has the formula:

$$(R')_y\!-\!Ar\!-\!(O\!-\!C\!\equiv\!N)_x$$

wherein Ar is benzene, naphthalene or anthracene, R' is hydrogen or an organic radical, $y$ is an integer from 0 to 3 and $x$ is an integer from 2 to 3.

3. The condensation product according to claim 2 wherein R' is hydrogen, alkyl having up to 4 carbon atoms, cycloalkyl having 5 or 6 carbon atoms, aralkyl having 7 to 10 carbon atoms-or phenyl dialkyl amino having up to 4 carbon atoms in each alkyl group, acylamino having up to 3 carbon atoms, halogen, nitro, sulphonic acid lower alkyl ester having up to 4 carbon atoms in the alkyl group, carboxylic acid amide, alkoxy having up to 4 carbon atoms, phenoxy, acyloxy having up to 3 carbon atoms, acyl having up to 4 carbon atoms, aldehyde, sulphonic, thiocyanogen, isothiocyanogen, alkylmercapto having up to 4 carbon atoms, phenylmercapto, acylmercapto having up to 4 carbon atoms and cyanic acid.

4. The condensation product according to claim 1 wherein the cyanic ester has the formula:

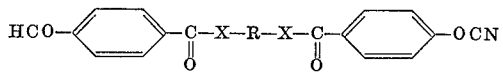

wherein X is O, NH or NR', R' being lower alkyl having up to 6 carbon atoms and R is the residue of a hydrocarbon having up to 12 carbon atoms or the residue of a polyalkylene glycol ether, a polyester, a polyurea, a polyamine, a polyurethane or a polyamide deprived from their functional hydroxyl or amino groups and having a molecular weight up to 10,000.

5. The condensation product according to claim 1 wherein the cyanic ester has the formula:

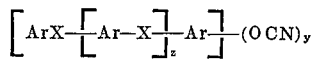

wherein the OCN groups are attached to the same or different Ar; $y$ is an integer from 2 to 3; Ar is a member selected from the group consisting of benzene and naphthylene; $z$ is an integer from 0 to 7 and X is a bridging member selected from the group consisting of a direct bond, oxygen, sulfur, $SO_2$, CO, alkylene having from 1 to 12 carbon atoms and —R—A—R wherein R is alkylene having from 1 to 6 carbon atoms and A is oxygen or sulfur.

6. A condensation product according to claim 1 wherein the amine has the formula $(R'')_y Ar\!-\!(NHR''')_2$ wherein Ar is a benzene or naphthylene residue, R'' is hydrogen, or an alkyl having up to 4 carbon atoms, cycloalkyl having 5 or 6 carbon atoms, aralkyl having 7 to 10 carbon atoms or phenyl dialkylamino having up to 4 carbon atoms in each alkyl group, acylamino having up to 3 carbon atoms, halogen, nitro, sulphonic acid lower alkyl ester having up to 4 carbon atoms, sulphonic acid amide, carboxylic acid lower alkyl ester having up to 4 carbon atoms, carboxylic acid amide, alkoxy having up to 4 carbon atoms, phenoxy, acyloxy having up to 3 carbon atoms, acyl having up to 4 carbon atoms, aldehyde, sulphonic, alkylmercapto having up to 4 carbon atoms, phenylmercapto and acylmercapto group having up to 4 carbon atoms; R''' is hydrogen or a lower alkyl having up to 6 carbon atoms and $y$ is an integer from 0 to 3.

7. A condensation product according to claim 1 wherein the amine has the formula:

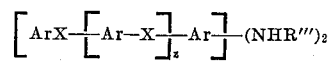

wherein the NHR''' groups are attached to the same or different Ar; Ar is a member selected from the group consisting of benzene and naphthylene; $z$ is an integer from 0 to 7 and X is a bridging member selected from the group consisting of a direct bond, oxygen, sulfur, $SO_2$, CO, alkylene having from 1 to 12 carbon atoms and

—R—A—R— wherein R is alkylene having from 1 to 6 carbon atoms and A is oxygen or sulfur; R''' is hydrogen or a lower alkyl ($C_1$–$C_6$).

8. A condensation product according to claim 1 wherein the amine is piperazine.

9. A condensation product according to claim 1 wherein the amine is an aliphatic amine with two NHR''' groups and an aliphatic hydrocarbon chain having up to 12 carbon atoms and R''' is hydrogen or a lower alkyl having up to 6 carbon atoms.

10. A condensation product according to claim 1 wherein the amine is an aliphatic amine with two NHR''' groups and an aliphatic hydrocarbon chain having up to 30 carbon atoms which is interrupted or substituted by groups containing only O, N or S atoms and R''' is hydrogen or a lower alkyl having up to 6 carbon atoms.

11. A condensation product according to claim 1 wherein the amine is a polyether, polyester, polyester amide, polyamide, polyurea, polyester urethanes or polyether urethanes with two —NHR'''-groups in which R''' is hydrogen or a lower alkyl having up to 6 carbon atoms.

12. A process for producing the condensation products according to claim 1 comprising reacting about equimolar portions of (a) a cyanic ester having the formula:

$$Ar(\!-\!O\!-\!C\!\equiv\!N)_x$$

wherein Ar is an aromatic radical, the —O—C≡N groups being bonded directly to nuclear carbon atoms thereof, and $x$ is an integer from 2 to 6 and (b) an amine having at least two amino groups with at least one hydrogen atom on each amino nitrogen atom in solution in an organic solvent.

References Cited

UNITED STATES PATENTS

| | | | |
|---|---|---|---|
| 2,292,443 | 8/1942 | Hanford | 260—77.5 |
| 2,595,400 | 5/1952 | Maynard | 260—77.5 |
| 3,006,898 | 10/1961 | Walter | 260—77.5 |
| 3,040,003 | 6/1962 | Beaman | 260—77.5 |

FOREIGN PATENTS

| | | |
|---|---|---|
| 98,561 | 6/1961 | Netherlands. |
| 927,657 | 5/1955 | Germany. |
| 1,055,524 | 1/1967 | Great Britain. |

(Other references on following page)

OTHER REFERENCES

Chemical Abstracts, vol. 54, p. 23640(h), Nov. 25, 1960.
Chemical Abstracts, vol. 62, pp. 5220–5222, Mar. 1, 1965.
Chemical Abstracts, vol. 62, p. 10354(d), June 21, 1965.
Chemical Abstracts, vol. 62, p. 16246(d), June 21, 1965.
Chemical Abstracts, vol. 64, p. 8439(e), Mar. 14, 1966.
Chem. Ber., vol 97(11), pp. 3027–3035 (1964).
Acta. Chem. Scand., vol. 13, pp. 289–300 (1959).
Saunders et al., Polyurethanes, part I, p. 65 (1961).

HOSEA E. TAYLOR, JR., Primary Examiner

M. J. WELSH, Assistant Examiner

U.S. Cl. X.R.

117—161; 260—13, 30.6, 30.8, 31.2, 31.8, 33.2, 33.6, 33.8, 37, 75, 77.5, 78, 823, 858, 859